UNITED STATES PATENT OFFICE.

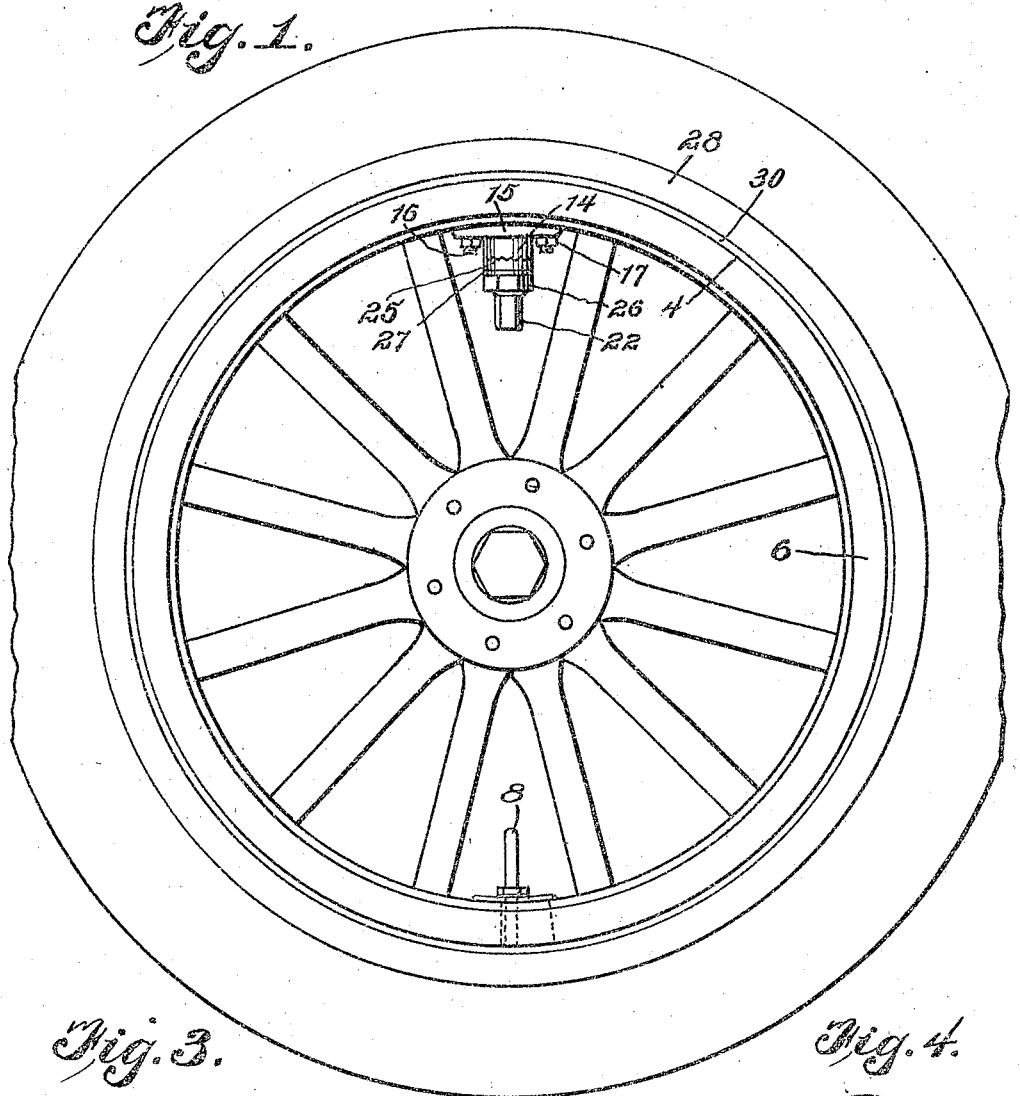
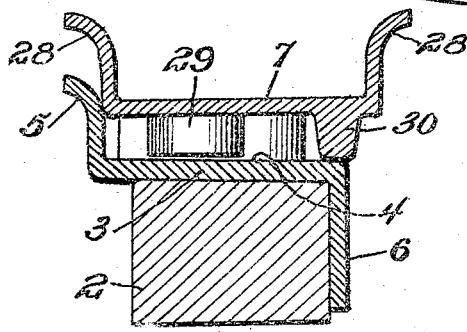
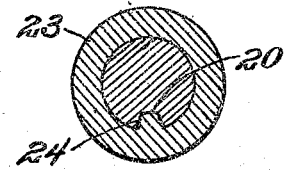

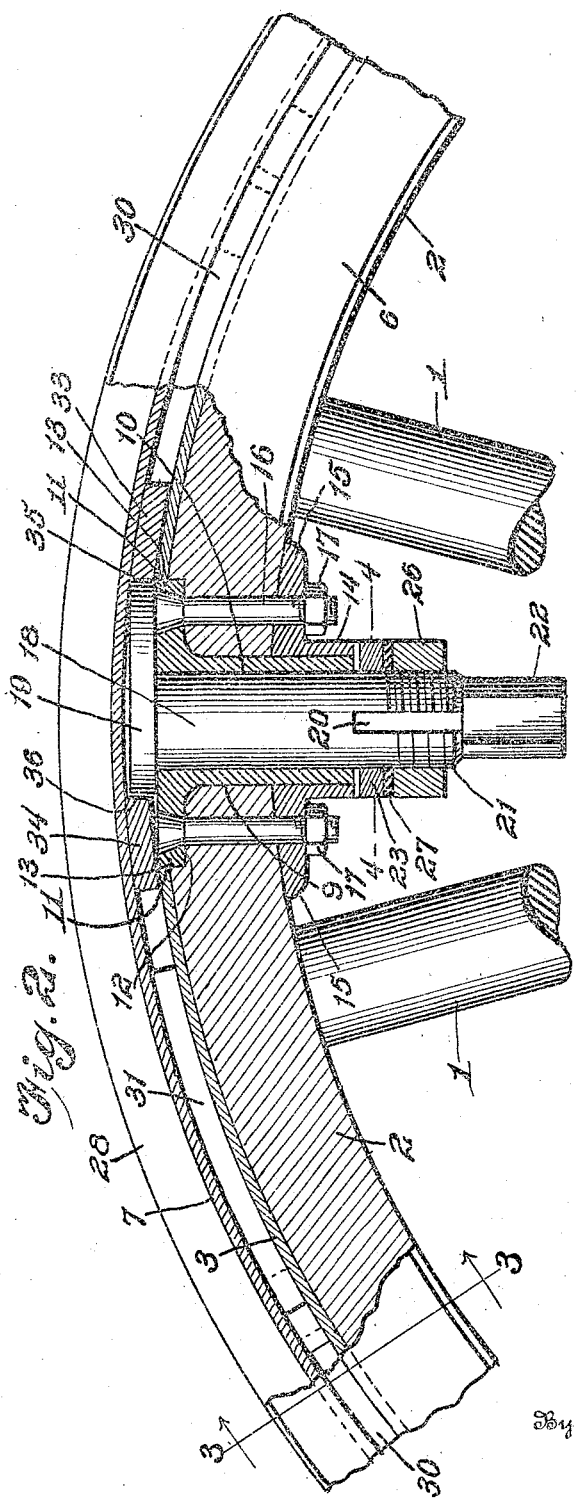

HOWARD N. MOODY, OF NEW ORLEANS, LOUISIANA.

DEMOUNTABLE RIM.

1,426,089.  Specification of Letters Patent.  Patented Aug. 15, 1922.

Application filed December 12, 1921. Serial No. 521,852.

*To all whom it may concern:*

Be it known that I, HOWARD N. MOODY, a citizen of the United States, residing at New Orleans, in the parish of Orleans and State of Louisiana, have invented new and useful Improvements in Demountable Rims, of which the following is a specification.

This invention relates to demountable tire-carrying rims for vehicle wheels, and has special reference to novel and improved means for safely and efficiently securing a demountable tire-carrying rim in place upon a fixed wheel-rim and for quickly and conveniently applying the tire-carrying rim to or removing it from the wheel-rim.

The object of the invention is to provide simple, reliable and efficient interlocking means for connecting a tire-carrying rim with a fixed rim, which means is operable, through the medium of a single-action tire-carrying rim adjusting and locking device, for effecting a practically instantaneous locking engagement of the tire-carrying rim with or its disconnection from the fixed wheel-rim.

The invention consists of the features of construction, combination and arrangement of parts, hereinafter fully described and claimed, reference being had to the accompanying drawings, in which:—

Figure 1 is a side elevation of a wheel showing the application of the invention thereto.

Figure 2 is a longitudinal section through a portion of the wheel-rim and the demountable rim applied thereto.

Figure 3 is a transverse section on line 3—3 of Figure 2.

Figure 4 is a detail section on the line 4—4 of Figure 2.

Figure 5 is a diagrammatic plan view of a portion of the wheel rim, showing the interlocking and releasing elements upon the rim members, the demountable rim being omitted.

Referring to the drawings, 1 designates the spokes and 2 the felly of an automobile or similar vehicle wheel of ordinary general construction, in which the felly proper is made of wood encompassed by a fixed outer metallic retaining band or rim 3, although it is to be understood that the invention may be applied to any type of wheel in which the felly and fixed rim, made of the same or different materials, are formed either as a unitary structure or of suitable parts properly joined together. The fixed rim 3, as shown herein, comprises a metallic band having a transverse outer seat face 4, provided at one side edge (its inner), with a demountable rim retaining flange 5, the opposite or outer side edge 6 of said fixed rim 3 being devoid of such a retaining flange at said side in order to permit of the application and removal of the demountable rim 7 by inward and outward movements in a direction transversely of the wheel.

The felly 2 and fixed rim 3 are provided at one side of the wheel with suitable openings for passage of the valve stem 8, and at the diametrically opposite side of the wheel the felly 2 is provided with an opening 9 for the passage of a bearing bushing 10. At its outer end the said bushing 10 is formed with integral projections 11 jointly providing a clamping plate which seats within a countersink 12 formed in the outer side of the felly and within a suitable opening 13 formed in the fixed rim 3. At its inner end the bushing 10 projects beyond the inner periphery of the felly and through a sleeve or housing 14 formed upon a cooperating clamping plate 15. The two clamping plates 11 and 15 are provided with openings for the passage of bolts 16 fitted with suitable nuts 17, which bolts pass through the felly and hold the bushing and clamping members securely assembled thereon. A rotary shaft 18 extends through the bushing 10 and is rotatable therein for working motion within an arc of 90°, and at its outer end this shaft 18 carries a cam 19 which is operable by means of the shaft, the clamping plate 11 forming an effective bearing support for the cam and a wear element with which the cam contacts. The inner end of the shaft 18 is provided with a longitudinal groove or keyway 20, a threaded surface 21 and an angular head or portion 22. Fitted upon such end of the shaft is a locking ring 23 having a key or spline 24 which engages the keyway 20, and having its outer edge provided with teeth or serrations to engage corresponding teeth or serrations on the sleeve or housing portion 14 of the bushing, said teeth or serrations being generally indicated at 25. The spline and groove connection between the locking ring and shafts is adapted to hold the ring from rotation, while permitting it to be moved longitudinally of the bolt toward and from the sleeve 14, while the teeth or serrations 25 upon said ring and sleeve are adapted for locking the ring against rotation, whereby when the ring is in set position the shaft 18 will also be locked from rotation, in a manner readily understood. The ring 23 is held adjustably in position by means of a nut 26 engaging the threads 21, and between which and the ring 23 may be placed a split spring or other desired form of lock washer 27 adapted to hold the nut 26 from retrograde rotation when screwed up to hold the locking ring in engagement with the sleeve 14. When the nut is tightened up and the ring 23 held in locking engagement with the sleeve 14 the shaft 18 will be locked against any possibility of movement, but by unscrewing the nut 26 to a predetermined extent so as to allow the locking ring 23 to be slipped out of engagement with the locking surface of the sleeve 14, the shaft 18 will be freed for rotary movement and may be turned by means of a suitable tool applied to its angular end 22.

The shaft 18 and cam 19 carried thereby constitute a single action throw device for shifting the demountable rim 7 so as to adjust it to locking and releasing positions, the said throw device operating in conjunction with interengaging adjusting and locking elements on the rim members 3 and 7 whereby this result is effected. The rim 7 may be of any suitable type to receive a solid tire, a cushion tire, or a pneumatic tire of any of the various types in use, but in the present instance, for simplicity of illustration, and as exemplifying one mode of use of my invention, I have shown the same of a form for holding a solid rubber tire. This rim 7 is provided with the side tire retaining flanges 28 and is designed to be slipped on and off the fixed rim 3 via the flangeless side 6 thereof. When the rim 7 is fitted in position upon the rim 3 it bears at its inner side against the retaining flange 5 and is locked from outward displacement by the interengaging adjusting and locking devices previously referred to, and which are hereinafter fully described. These devices include as part thereof round or disk-shaped locking lugs 29 disposed upon the base of the body of the rim member 7 so as to lie adjacent to the flange 5 and support and space the body of the rim 7 from the body of the rim 3 at the inner sides of the center of the rim members when the two rim members are fitted together, the rim 7 being supported and spaced at its outer side from the rim 3 by a flange 30 integral with and extending around said rim 7.

The locking lugs 29 are provided upon the inner side of the rim member 7 for the purpose described and also for cooperation with coacting locking devices 31 on the outer face of the body of the rim member 3. These locking members 31 are in the form of inclined ribs extending transversely of the rim 3 at a suitable diagonal working angle, to wit, an angle of from 13 to 16 degrees, said ribs 31 forming in effect spiral threads upon the rim member 3 for coaction with the lugs or projections 29 upon the rim member 7. The ribs or threads 31 extend a suitable distance on opposite sides of the central line of the rim body 3 and have outer flat or slightly curved faces on which rim 7 may seat for general support, and their outer ends are provided with curved guide surfaces 32 to ensure an easy movement of the lugs 29 thereover at the moment of placing or displacing the demountable rim 7. Any suitable number of the locking lugs 29 on the rim member 7 and coacting threads or ribs 31 on the rim member 3 may be provided, there being at least one lug 29 for each rib 31, one of the lugs and one of the ribs operating in working pairs, and there being in practice any desired number of these working pairs of lugs and ribs or threads around the surface of the wheel. In practice, for the purpose of ensuring a reliable and efficient locking action at all points, it is preferred to place the lugs 29 and ribs 31 in such manner as to lie in line with the spaces between the adjacent spokes 1 except at the diametrically opposite points where the valve stem 8 and shaft 18 and its cam 19 are provided, but any suitable number and arrangement of the locking lugs and ribs upon the rim members may be employed.

The locking devices 29 and 31, which further serve the function of guiding elements, are designed to effect an applying or releasing movement of the rim 7 transversely of the rim 3 when the rim 7 is moved longitudinally or rotated in one direction or the other upon the rim 3 by the action of the throw cam 19, so that the rim 7 will be given a combined circumferential and lateral applying or releasing movement, said rim 7 being adjusted under its applying movement into proper seating and locking position on the rim member 3 and in its releasing movement being unseated and shifted bodily off the rim 3, so that a conjoint releasing and moving action will be obtained. Abutment plates or members 33 and 34 are provided upon the rim member 7 for cooperation with the cam 19, and said plates 33 and 34 are provided with abutment edges 35 and 36 for engagement by the periphery of the cam, whereby when the cam is swung in one direction or the other through an arc of 90° the rim member 7 will be shifted longitudinally or circumferentially in one direction or the other to effect its placement upon the rim 3 or displacement therefrom. Figure 2 shows all the parts in the positions they assume when the rim member 7 is fully seated or applied on the rim member 3, from which it will be seen that the point of the cam 19, which is fully thrown in one working direction, engages the edge 35 of plate 33, and the lugs 29 are in engagement with the inner surfaces of the spiral threads or ribs, the cam 19, which is locked by the coller 23 in such position, thereby holding the rim member 7 from circumferential movement in either direction, while the lugs and ribs 31 hold the rim member 7 from lateral displacement from the rim member 3. When the nut 26 and lock collar 23 are adjusted to move said lock collar to non-locking position, the cam 19 may be thrown by the action of the shaft 18 to an opposite working or throw position in which its point engages the edge 36 of plate 34, in which action the rim member 7 will be shifted circumferentially in the proper direction to cause the lugs 29 to ride off the ribs 31 to force the rim member 7 off the rim member 3 at the flangeless side 6 thereof, thus effecting a complete displacement of the rim member 7 from the rim member 3 in the releasing action.

In the operation of placing a rim 7 in position upon the rim 3, the cam 19 is turned to released position, in which its point lies diametrically opposite the position shown in Figures 2 and 5, and the rim member 7 is placed at the flangeless side 6 of the rim member 3 so that the lugs 29 engage or abut against the guide surfaces 32 of the spiral threads or ribs 31. When the rim 7 is so placed a suitable form of tool is engaged with the angular end 22 of shaft 18, and said shaft turned to the position shown in Figures 2 and 5. In this operation the point of the cam will engage the edge 35 of plate 33 and move the rim 7 circumferentially or longitudinally on the rim 3 in the proper direction to cause the lugs 29 to engage and ride upon the inner surfaces of the ribs 31. This movement of the lugs 29 along the ribs 31 will obviously cause the rim 7 to move laterally of the rim 3, such movement continuing until the inner side of said rim 7 engages and fully abuts against the flange 5 at the inner side of the rim 3, in which position the rim 7 will seat on the outer faces of ribs 31 and the lugs 29 and flange 30 will seat upon the face of the rim 3 and stably support the rim 7 against any possibility of tilting motion in a transverse direction. By the operation described a conjoint circumferential and lateral movement of the rim 7 is established on the rim 3, the circumferential motion being produced by the direct action of the cam 19 and the lateral motion by the guiding action of the lugs 29 along the spiral ribs or threads 31. When the cam 19 is fully thrown to the applying position shown in Figures 2 and 5, and said cam is locked in said position by the collar 23, reverse circumferential motion of the rim 7 will be prevented, and the lugs 29 engaging the inclined ribs or threads 31 will also hold the rim 7 locked against any possibility of lateral motion causing its displacement from the rim 3. When it is desired to remove the rim 7 from the rim 3, the cam shaft 18 is unlocked and its shaft thrown to releasing position, in which the point of the cam engages the edge 36 of plate 34 and moves the rim 7 longitudinally or circumferentially in the opposite direction to that previously described. In this operation the lugs 29 ride down the inclined surfaces of the ribs 31 and off the guide surfaces 32 thereof, a conjoint circumferential and lateral motion being produced whereby the rim member 7 is not only unlocked from the rim member 3 but also positively forced off said rim member 3, thus securing a quick, positive, easy and reliable demounting action.

It will be understood by reference to Figure 3 that the base of the rim member 3 is pitched so as to incline or slant transversely downwardly and outwardly from its flange side 5 toward its flangeless side 6, and that the flat bases of the circular lugs 29 are correspondingly but reversely pitched, slanted or beveled, thus ensuring a firm seating and wedging engagement of the lugs 29 with the face of the rim 3 in the applying movement of the rim 7, and a very rapid release of frictional engagement between said surfaces when the rim member 7 and at the moment of abutment of rim 7 with flange 5 is moved laterally of the rim member 3 in the demounting action. Such formation of the engaging surfaces of the lugs 29 and face of the rim 3 also ensures a perfect radial alinement of the rim 7 with the wheel when said rim 7 is fully applied, obviating any liability of the demountable rim and tire being disposed in an untrue position when fully seated for operation upon the fixed rim. As set forth, the lugs 29 are in the form of circular disks, which form is of advantage in securing stable engagement and support without making the lugs of undue size and weight and the frictional engagement excessive. Furthermore, as these lugs prevent convexly-curved peripheral surfaces for engagement with the inner vertical faces of the ribs 31, the surface contact is minimized without reducing the strength of the lugs, with a consequent reduction of friction and reduction in the area of contacting surfaces liable to rust. The flange 30 not only gives support for the rim 7 at its outer side, but closes the space between the faces of the rim members at such side, thus excluding dust, dirt, moisture, pebbles, etc., while at the same time covering an unsightly gap and giving a nicely finished appearance to the wheel.

From the foregoing description taken in connection with the drawings, the construction and mode of operation of my improved demountable rim will be readily understood and it will be seen that the invention provides a rim which, through a single throw action of the operating device in one direction will effect a combined seating of the rim in position and a positive locking of the rim in such position, while through a reverse single throw action of the operating device the demountable rim will not only be locked but positively displaced from the fixed rim. My invention therefore provides a demountable rim which may be quickly applied and released with a minimum amount of labor and time on the part of the operator, enabling tires to be changed with great facility and without the necessity of releasing or detaching and reapplying a large number of fastening parts, or of manipulating parts which are of a structure liable to be rusted or broken and accordingly difficult if not impossible to operate at the time required. My invention overcomes the well known and manifold objections to the use of ordinary demountable rims using wedge lugs and other similar fastenings.

In practice, the invention may be applied to any suitable or well known and commonly used form of demountable rim, and the rim may be used as a spare tire carrier as well as for wheel service like demountable rims of usual constructions. No complicated mechanism is required with my rim construction in applying and removing the demountable rim, as in practice but a simple form of bar wrench is necessary, one end of which may be formed for engagement with the angular end 22 of the shaft 18 and the other end for engagement with the nut 26, and if such type of wrench should be lost or misplaced the shaft and nut may be operated by other forms of tools in common use.

Having thus fully described my invention, I claim:—

1. In a demountable rim for vehicle wheels, the combination of a fixed rim having a flange at the inner side thereof and flangeless at the outer side thereof, a demountable rim movable laterally on and off the fixed rim via the flangeless side thereof and also movable circumferentially on said fixed rim, inclined ribs upon one of said rims forming spiral threads extending diagonally across the face of said rim substantially at a pitch angle of from 13 to 16°, said ribs having substantially straight longitudinal inner faces arranged perpendicularly to the plane of the wheel, lugs upon the other of said rims having lateral surfaces for bearing and sliding contact engagement with said straight longitudinal inner faces of the inclined ribs, and means for moving the demountable rim circumferentially in one direction or the other on the fixed rim.

2. In a demountable rim for vehicle wheels, the combination of a fixed rim having a flange at the inner side thereof and flangeless at the outer side thereof, a demountable rim movable laterally on and off the fixed rim via the flangeless side thereof and also movable circumferentially on said fixed rim, inclined ribs upon one of said rims forming spiral threads extending diagonally across the face of said rim substantially at a pitch angle of from 13 to 16°, said ribs having substantially straight longitudinal inner faces arranged perpendicularly to the plane of the wheel, lugs upon the other of said rims having lateral surfaces for bearing and sliding contact engagement with said straight longitudinal inner faces of the inclined ribs, spaced contact members on the demountable rim, and a cam rotatable in a fixed plane upon a rotatable non-sliding axis arranged radially of the wheel for engagement with one or the other of said spaced contact members to shift the demountable rim circumferentially in one direction or the other on the fixed rim.

3. The combination of a fixed rim having a flange at its inner side and flangeless at its outer side, a demountable rim movable laterally on or off the fixed rim and also circumferentially on said fixed rim, inclined ribs on one of said rims forming spiral threads, lugs upon the other of said rims for engagement with the inner vertical faces of said ribs, said lugs being arranged to support the demountable rim from the fixed rim substantially between the centers of said rims and the flanged side of the fixed rim, means at the outer side of the demountable rim to seat upon and support it at such side from the fixed rim, and means for moving the demountable rim circumferentially in one direction or the other on the fixed rim.

4. The combination of a fixed rim provided at its inner side with a retaining flange and flangeless at its outer side, said rim having a seat face transversely inclining at a slight angle downwardly and outwardly between such sides, a demountable rim movable laterally on and off and circumferentially on said fixed rim, inclined ribs on the fixed rim forming spiral threads, lugs upon the demountable rim to engage the inner vertical faces of said ribs, said lugs being arranged to seat upon the fixed rim substantially between the center of said rim and the retaining flange thereof and having seat faces transversely inclined to conform to the incline of the seat face of the fixed rim for a wedging engagement therewith on a lateral movement of the demountable rim toward said flange, a flange upon the outer side of the demountable rim bearing on the face of the fixed rim and supporting the demountable rim therefrom at such side, said flange also closing the space between the rims, and means for moving the demountable rim in one direction or the other circumferentially on the fixed rim.

5. In a demountable rim, a wheel having a felly and a fixed rim, a demountable rim movable laterally on and off and circumferentially upon said fixed rim, interengaging projections on said rims operative to shift the demountable rim laterally in one direction or the other when moved circumferentially in one direction or the other, spaced abutments on the demountable rim, a bushing sleeve projecting radially of the wheel through the felly and fixed rim and having at its outer end a clamping and wear plate countersunk in the felly and fixed rim, a removable clamping plate engaging the inner end of the bushing sleeve, fastening means securing said clamping plates to each other and to the wheel, a rotary cam bearing upon said clamping and wear plate and lying between the said spaced abutments on the demountable rim, a shaft extending through said bushing sleeve and carrying said cam, and means for locking said shaft and cam to the wheel against rotary motion.

6. In a demountable rim, a wheel having a felly and a fixed rim, a demountable rim movable laterally on and off and circumferentially upon said fixed rim, interengaging projections on said rims operative to shift the demountable rim laterally in one direction or the other when moved circumferentially in one direction or the other, spaced abutments on the demountable rim, a bushing sleeve projecting radially of the wheel through the felly and fixed rim and having at its outer end a clamping and wear plate countersunk in the felly and fixed rim, a removable clamping plate engaging the inner end of the bushing sleeve, fastening means securing said clamping plates to each other and to the wheel, a rotary cam bearing upon said clamping and wear plate and lying between the said spaced abutments on the demountable rim, a shaft extending through said bushing sleeve and carrying said cam, the said bushing sleeve and removable clamping plate having locking teeth, a toothed locking sleeve adapted for engagement with said locking teeth and splined upon the shaft to slide thereon and rotate therewith, a clamping nut on the shaft, and a locking washer on the shaft between said locking sleeve and clamping nut.

7. The combination of a fixed rim provided with a retaining flange at its inner side and flangeless at its outer side, inclined ribs on said rim forming spiral threads, a demountable rim adapted when applied to the fixed rim to abut at its inner side against said flange and to have its base rest upon the outer surfaces of said ribs and to be spaced thereby from the seat face of the fixed rim, disk-like projections upon the demountable rim having convex surfaces for minimum surface contact engagement with the inner vertical faces of the ribs and abutment faces for contact with the seat face of the fixed rim, said projections being arranged and adapted for supporting the demountable rim from the fixed rim substantially between the centers of said rims and the inner sides thereof, means for shifting the demountable rim on the fixed rim, and a flange member arranged between the seat faces of the rims at the outer sides thereof and supporting the demountable rim at such side from the fixed rim, said flange also closing the space at such side between said rims.

In testimony whereof I affix my signature.

HOWARD N. MOODY.